United States Patent
Chen et al.

(10) Patent No.: US 11,886,590 B2
(45) Date of Patent: Jan. 30, 2024

(54) EMULATOR DETECTION USING USER AGENT AND DEVICE MODEL LEARNING

(71) Applicant: PayPal, Inc., San Jose, CA (US)

(72) Inventors: Zhe Chen, Singapore (SG); Hewen Wang, Singapore (SG); Quan Jin Ferdinand Tang, Singapore (SG); Solomon kok how Teo, Singapore (SG); Yuzhen Zhuo, Singapore (SG); Serafin Trujillo, San Jose, CA (US); Mandar Ganaba Gaonkar, San Jose, CA (US); Omkumar Mahalingam, Santa Clara, CA (US); Kenneth Bradley Snyder, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 318 days.

(21) Appl. No.: 17/473,490

(22) Filed: Sep. 13, 2021

(65) Prior Publication Data
US 2023/0084532 A1   Mar. 16, 2023

(51) Int. Cl.
*G06F 40/205* (2020.01)
*G06F 18/2413* (2023.01)
*G06F 21/56* (2013.01)
*G06F 18/214* (2023.01)

(52) U.S. Cl.
CPC ........ *G06F 21/566* (2013.01); *G06F 18/2148* (2023.01); *G06F 18/2413* (2023.01); *G06F 40/205* (2020.01); *G06F 2221/034* (2013.01)

(58) Field of Classification Search
CPC .. G06F 21/566; G06F 40/205; G06F 18/2148; G06F 18/2413; G06F 2221/034

USPC .................................................. 726/26
See application file for complete search history.

(56) References Cited

U.S. PATENT DOCUMENTS

| | | | |
|---|---|---|---|
| 8,997,226 | B1 * | 3/2015 | Call ............... H04L 63/1483 709/224 |
| 9,667,613 | B1 * | 5/2017 | Wisemon ............ H04W 12/12 |
| 10,165,004 | B1 * | 12/2018 | Mehta ................... H04L 67/02 |
| 11,076,291 | B2 * | 7/2021 | Boutnaru ............... G06F 9/455 |
| 2020/0014722 | A1 * | 1/2020 | Walters .............. G06F 21/6245 |
| 2020/0210566 | A1 * | 7/2020 | Perkal ................... G06F 21/44 |
| 2021/0136096 | A1 * | 5/2021 | Janakiraman ....... H04L 63/1425 |
| 2022/0201010 | A1 * | 6/2022 | Tarsauliya ............ G06F 21/604 |

OTHER PUBLICATIONS

Mohammed K. Alzaylaee et al., "Emulator vs Real Phone: Android Malware Detection Using Machine Learning". Proceedings of the 3rd ACM on International Workshop on Security and Privacy Analytics, 2017, pp. 65-72.

(Continued)

*Primary Examiner* — Thanh T Le
(74) *Attorney, Agent, or Firm* — Haynes and Boone, LLP

(57) ABSTRACT

Systems and methods for emulator detection are disclosed. In one embodiment, a user agent string may be embedded into a first numerical data vector representation. Hardware characteristics of a client device corresponding to the user agent may be embedded into a second numerical data vector representation. Based on the first numerical data vector representation of the user agent and the second numerical data vector representation of the hardware characteristics, and their consistency, the client device may be determined to be an emulator or a non-emulator device.

20 Claims, 6 Drawing Sheets

(56) References Cited

OTHER PUBLICATIONS

Piotr Bojanowski et al., "Enriching Word Vectors with Subword Information." Transactions of the Association for Computational Linguistics 5 (2017), pp. 135-146.
Ilay Bregman, "Emulator Fraud-as-a-Service: The Threat Landscape Continues to Evolve." Web Page https://blog.securedtouch.com/emulator-fraud-as-a-service-the-threat-landscape-continues-to-evolve, 6 pages, Aug. 31, 2020, retrieved from Internet Archive Wayback Machine < https://web.archive.org/web/20200928092817/https://blog.securedtouch.com/emulator-fraud-as-a-service-the-threat-landscape-continues-to-evolve> on Dec. 20, 2021.
Ray Chong. [n.d.]. "Android Emulator Detection." Retrieved from the Internet. Retrieved from <https://jhao0411.medium.com/android-emulator-detection-4d0f994aab5e>> on Dec. 14, 2021, 5 pages.
Yiming Jing et al. "Morpheus: automatically generating heuristics to detect android emulators." Proceedings of the 30th Annual Computer Security Applications Conference, 2014, pp. 216-225.
Simone Mutti et al. "Baredroid: Large-scale analysis of android apps on real devices." Proceedings of the 31 $^{st}$ Annual Computer Security Applications Conference, 2015, pp. 71-80.
Timothy Vidas et al. "Evading android runtime analysis via sandbox detection." Proceedings of the 9th ACM symposium on Information, computer and communications security, 2014, pp. 447-458.
Yang Zhang et al. "Detecting malicious activities with user agent-based profiles." International Journal of Network Management 25, 5 (2015), pp. 306-319.

\* cited by examiner

EMULATOR DETECTION USING USER AGENT AND DEVICE MODEL LEARNING

TECHNICAL FIELD

The present disclosure generally relates to computer security and more particularly to detection of emulators used to simulate other electronic devices or software.

BACKGROUND

As electronic transactions are increasingly conducted through electronic devices such as mobile devices, malicious actors are using electronic device emulators to conduct fraud with stolen accounts. Such emulators allow malicious actors to imitate a victim's electronic device and, accordingly, fool anti-fraud mechanisms. Typically, configuration-based indicators (e.g., SIM configurations, hardware configurations, hardware identification numbers, root access, and other indicators) are used to detect when an emulator is used. However, as emulator abilities improve, such emulators may imitate almost all parameters of electronic devices. Thus, detection of when an emulator is used becomes increasingly difficult.

Figure 1:
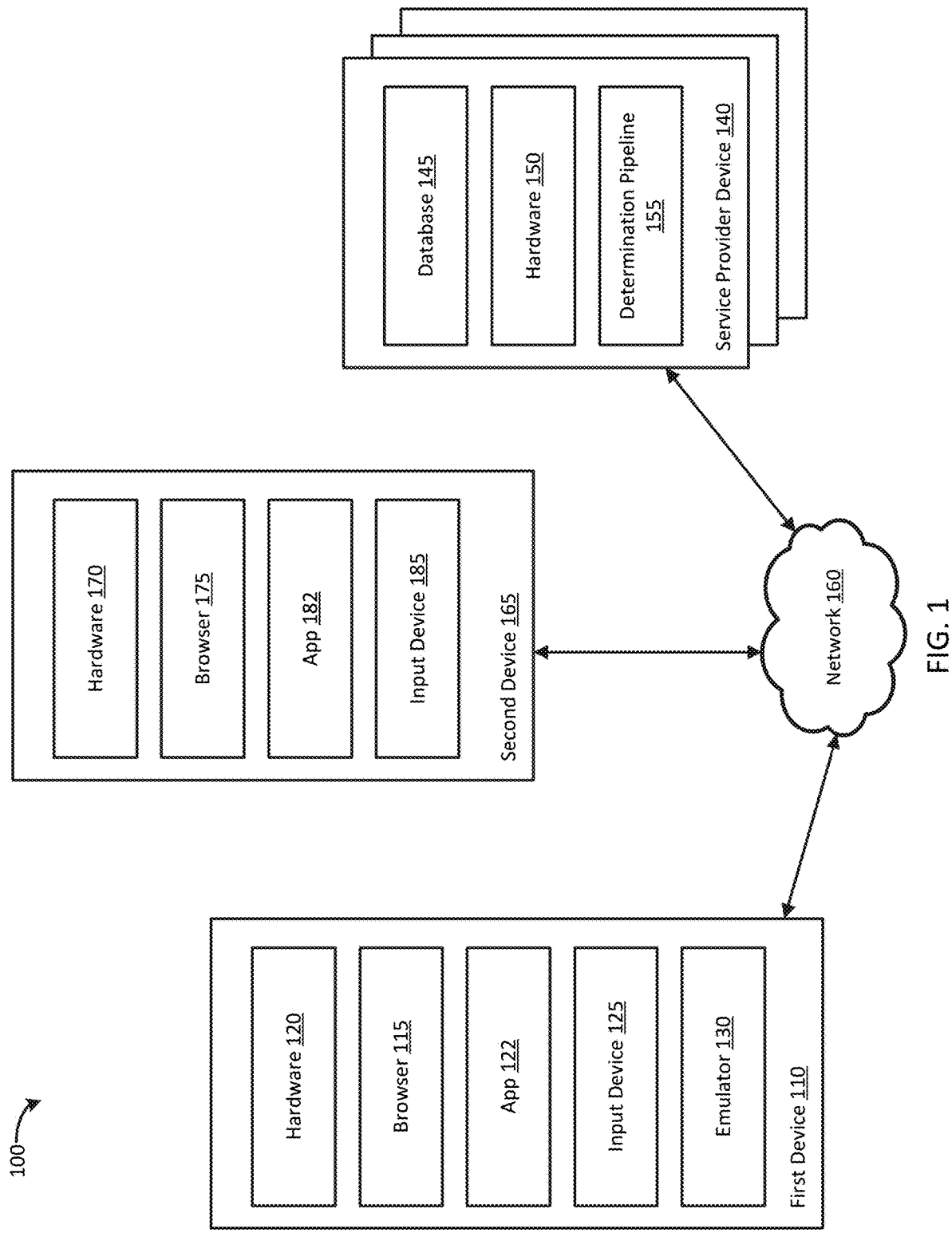
FIG. 1 illustrates a block diagram of a networked system suitable for implementing one or more embodiments of the present disclosure.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced using one or more embodiments. In one or more instances, structures and components are shown in block diagram form in order to avoid obscuring the concepts of the subject technology. One or more embodiments of the subject disclosure are illustrated by and/or described in connection with one or more figures and are set forth in the claims.

An emulator may be a software program executing on a computing device that simulates the features of a real mobile device. Although emulator-based attacks are not new, fraudsters of all skill levels are now using emulator tools with increasing frequency to emulate mobile devices as they become more ubiquitous for online access. Hardware-based detection has conventionally been used to detect emulators by finding inconsistencies in the hardware of computers. However, the hardware configuration of an emulator is usually modifiable, which allows fraudsters to bypass the conventional hardware-based detection methods. The present disclosure provides systems and methods to transform a hardware configuration into a device model representation and analyze the consistency between the device model and its corresponding user agent to detect the presence of an emulator.

A user agent can be software, acting on behalf of a user, executing on a computing device to perform tasks such as, for example, retrieving, rendering, and facilitating end-user interactions with content (e.g., web content or resources) according to various embodiments. Some example user agents are web browsers, email readers, media players, and application plug-ins. When a user agent operates in a network protocol, it often identifies itself, its application type, operating system, software vendor, or software revision by submitting a characteristic identification string to its operating peer. In HTTP, SIP, and NNTP protocols, this identification is transmitted in a header field "User-Agent." In HTTP, a user agent string is often used for content negotiation, where the origin server selects suitable content or operating parameters for a response to a requesting user agent. For example, the user agent string might be used by a web server to choose variants based on the known capabilities of a particular version of client software.

Detecting fraudulent user agents (e.g., fake user agents, spoofed user agents, etc.) can be an important step in detecting fraudulent requesting-clients in a client-server environment as a manipulated or fraudulent user agent strongly indicates the presence of an emulator or a robot. However, identifying such user agents can be a difficult task as user agents can have a structure that, before its first appearance, had previously been unseen. Thus, it is not practical to use traditional rule-based methods that mostly rely on whitelists/blacklists used against certain known types of fraudulent user agents. Further, training a general machine learning model to perform the detection may be impractical since there are limited labeled fraudulent user agent datasets (e.g., no public datasets). Additionally, although user agents are identified in string-format (e.g., character string), traditionally there has been a lack of effective methods to extract useful features from user agent strings. The present disclosure provides systems and methods that overcome the deficiencies in traditional methods by learning user agent sentence semantics to generate a user agent vector representation that can be combined with device model representations to determine whether a client device is using an emulator.

For example, in one embodiment, an emulator detection pipeline extracts device model information from hardware features of a device through a device model prediction task. The pipeline may transform a user agent string corresponding to the device into a vector representation by learning the user agent string's sentence semantics. The pipeline may determine whether the device is using an emulator by analyzing the hardware configuration, user agent, and the consistency between the hardware configuration and the user agent. Further details and additional embodiments are described below in reference to the accompanying figures.

FIG. 1 is a schematic diagram showing a system 100 according to an embodiment of the disclosure. System 100 may include or implement one or more electronic devices such as mobile devices, desktop computers, servers, and/or software components that operate to perform various transactions or processes. It will be appreciated that system 100 illustrated in FIG. 1 may be deployed in other ways and that the operations performed and/or the services provided by the electronic devices described herein may be combined or separated for a given implementation and may be performed by a greater number or fewer number of devices.

System 100 may include a first device 110, a service provider device 140, and a second device 165. The devices of system 100 may communicate with one or more other devices over network 160. The service provider device 140 may be maintained by a service provider (e.g., a payment service provider or other service provider entity). In certain embodiments, service provider device 140 may be integrated into one or more servers. Such servers may additionally be configured to perform other operations, such as payment or transaction processing. Such servers may also include one or more databases storing data (e.g., historical transactions or device data) related to one or more devices (e.g., first device 110, second device 165, etc.). Such data may aid in the determination of the identity of devices communicating with service provider device 140. For example, service provider device 140 may include a determination pipeline 155 that determines whether a device is using an emulator. The determination pipeline 155 may be built from (e.g., trained by) for example, historical data (e.g., historical payload data collected by the service provider). The service provider device 140 may input device data and user agent data to the determination pipeline 155 to determine whether the data substantially corresponds to the use of an emulator by the device, as further discussed herein.

A user may utilize the first device 110 to communicate with a service or transaction provider controlling or otherwise associated with the service provider device 140. The user may utilize the first device 110 to initiate an electronic transaction, request information, conduct a transaction, or interact with the service provider in another manner. "Transaction," as used herein, refers to any suitable action performed using electronic devices, including product or service purchases, payments, transfer of information, display of information, electronic services, etc.

The first device 110, service provider device 140, and second device 165 may each include one or more processors, memories, and other appropriate components for executing instructions such as program code and/or data stored on one or more computer readable mediums to implement the various applications, data, and steps described herein. For example, such instructions may be stored in one or more computer readable media such as memories or data storage devices internal and/or external to various components of the system 100, and/or accessible over the network 160. The network 160 may be implemented as a single network or a combination of multiple networks. For example, in various embodiments, the network 160 may include the Internet and/or one or more intranets, landline networks, wireless networks, and/or other appropriate types of networks.

The first device 110 may be implemented using any appropriate hardware and software configured for wired and/or wireless communication over the network 160. For example, in one embodiment, the first device 110 may be implemented as a personal computer (PC), a smart phone, laptop computer, a tablet, a wearable computing device, and/or other types of computing devices that includes hardware 120 capable of receiving user inputs and transmitting and/or receiving data. Hardware 120 may include components to operate one or more user interfaces (e.g., touch screens, a mouse, a keyboard, and other input device) as well as processors, memory, screens, speakers, battery, disk storage, sensors and other hardware devices that can be used to operate the first device 110.

The first device 110 may additionally include an emulator 130. Emulator 130 may be a hardware and/or software-based emulator. Thus, emulator 130 may be, for example, a program operated on the first device 110 separately or concurrently with one or more other programs. In certain embodiments, the emulator 130 may allow the first device 110 to imitate another device. For example, the emulator 130 may allow the first device 110, when interacting with one or more other devices such as the service provider device 140, to provide data falsely identifying the first device 110 as another device. Such data may identify first device 110 as a device with different hardware, a different operating system, or utilizing different software from what the first device 110 actually possesses.

In certain embodiments, the first device 110 may include one or more user identifiers which may be implemented, for example, as operating system registry entries, cookies associated with browser application 115, identifiers associated with hardware of first device 110, or other appropriate identifiers, such as used for payment/user/device authentication. In one embodiment, such a user identifier may be used by a payment service provider to associate with a particular account maintained by the payment provider. The emulator 130 may be configured to modify or change such user identifiers. For example, the first device 110 may be a device with processor A and memory amount X. The emulator 130 may disguise the first device 110 as a device with processor B and/or memory amount Y. Additionally, the emulator 130 may disguise the first device 110 as utilizing an operating system different than what the first device 110 is actually operating. Accordingly, the emulator 130 may allow for first device 110 to, for example, pose as the second device 165 using characteristics of and for identifying the second device 165.

Emulator 130 may be used in a manner to allow a first user of the first device 110 to fraudulently obtain account information belonging to a second user of the second device 165. For example, the first user may be in possession of a variety of stolen accounts. Such accounts may typically be accessed through different types of computing devices, including mobile computing devices. For example, the first device 110 may be an electronic device such as a desktop computer operating the emulator 130 in an attempt to emulate a mobile computing device. The emulator 130 may then allow the first device 110 to pose as a variety of different mobile devices (e.g., by changing the device that emulator 130 is emulating). Accordingly, the number of accounts that the first user can access (e.g., to verify that the accounts are still operational), as well as the speed at which the accounts are accessed, can be increased. Furthermore, the first user may quickly access such accounts by using a keyboard and mouse to interact with one or more webpages of the service provider associated with service provider device 140. The first device 110 may accordingly utilize the emulator 130 to disguise the first device 110 as the known electronic device of each of the stolen accounts to evade detection.

The first device 110 may additionally include one or more browser applications 115 which may be used, for example, to provide an interface for the first user to browse information available over the network 160. In one embodiment, the browser application 115 may be implemented as a web browser configured to view, access, and/or provide information available over the Internet. In certain embodiments, the first user may operate the emulator 130 and the browser applications 115 concurrently. Accordingly, the emulator 130 may modify data provided from the browser applications 115. Such modified data may be provided over the network 160 to the service provider device 140 to aid in disguising the first device 110 as, for example, the second device 165.

The browser applications 115 and the first device 110 generally may be operated by input received through an input device 125. The input device 125 may allow for a user to provide instructions to the first device 110. The input device 125 may be one or more of a touchscreen, a mouse, a keyboard, a microphone, an external device coupled to the first device 110 (e.g., a joystick), a camera, and/or another such device configured to receive user inputs and/or instructions.

The first device 110 may further include other applications 122 to perform other functions or provide other features for the first device 110. For example, the other applications 122 may include security applications for implementing client-side security features, programmatic client applications for interfacing with appropriate application programming interfaces (APIs) over the network 160, or other types of applications. The applications 122 may also include applications that enable the user to communicate, transfer information, make payments, and otherwise conduct transactions through the service provider as discussed above.

The service provider device 140 may be maintained, for example, by a merchant or service provider offering various products and/or services (e.g., transaction or payment processing services). The service provider device 140 may include hardware 150, which may be similar to hardware 120 of the first device 110 and configured to allow operation of service provider device 140 (e.g., by providing processing resources, cooling, and/or performing other operations as described herein).

The service provider device 140 may also include a database 145 that stores data associated with transactions, accounts, and/or users associated with the service provider. In certain embodiments, the accounts may be user accounts maintained by the service provider. Such accounts may typically be accessed through electronic devices of the users. The database 145 may further include data associated with such electronic devices, such as data identifying the make, model, hardware and/or software configuration, and/or specific serial numbers of electronic devices that are determined to be associated with each user. Accordingly, the database 145 may store data identifying hardware and/or software configurations of the electronic devices. Such data may be used to determine if any instance of user account access may be potentially fraudulent as further described herein. Potentially fraudulent transactions may accordingly be flagged and further action may be taken to verify the transaction, lock or cancel the action, or otherwise confirm the identity of the user to prevent fraud.

The service provider device 140 may also include a determination pipeline 155. In various embodiments, the determination pipeline 155 may be implemented as hardware, software, or a combination thereof. For example, the determination pipeline 155 may be a computer implemented program. In various embodiments, the determination pipeline 155 may receive data from hardware and/or software of the service provider device 140. From such data, determination pipeline 155 may obtain/receive data provided by an electronic device from communications circuitry of the service provider device 140 and may then determine whether the electronic device is operating an emulator.

The second device 165 may be operated by a second user. The second user may be associated with an account that the first user has fraudulently obtained. Second device 165 may include similar components (e.g., hardware 170, browser 175, applications 182, and input device 185) to that of the first device 110. Such components may include the features described for corresponding components of the first device 110. However, the second device 165 may not include an emulator as the second user is not trying to fraudulently access accounts of other users or perform other malicious acts.

Figure 2:
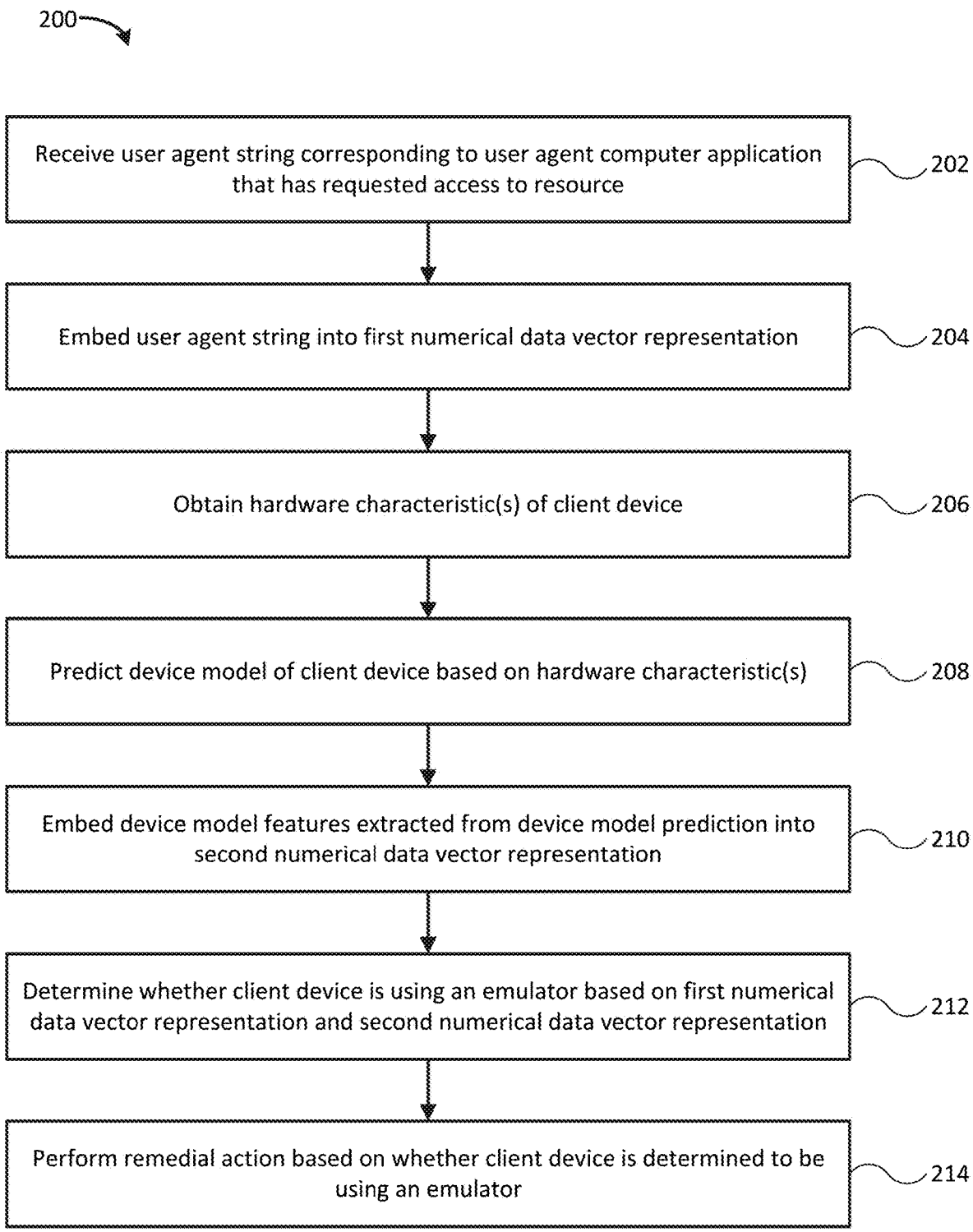
FIG. 2 is a flowchart showing an example of operations performed in an emulator detection process in accordance with one or more embodiments of the present disclosure.

Referring now to FIG. 2, illustrated is a flow diagram of a process 200 for detecting whether a client device is using an emulator in accordance with one or more embodiments of the present disclosure. The blocks of the process 200 are described herein as occurring in serial, or linearly (e.g., one after another). However, multiple blocks of the process 200 may occur in parallel. In addition, the blocks of the process 200 need not be performed in the order shown and/or one or more of the blocks of the process 200 need not be performed. In some embodiments, the process 200 may be performed by a computer system comprising a non-transitory memory storing instructions corresponding to one or more steps in the process 200 and one or more hardware processors configured to execute the instructions. In various embodiments, a non-transitory machine-readable medium may have instructions stored thereon which are executable to cause a machine to perform certain steps of the process 200. The steps and sub-steps in the blocks of the process 200 are primarily described below in reference to FIGS. 1, 3, and 4, however the description of the process 200 may generally be applied to the additional figures of the present disclosure, and vice versa.

At block 102, a system 300 (shown in FIG. 3) may receive a user agent character string 302 corresponding to a user agent computer application that has requested access to a resource associated with a service provider. For example, the resource may include web content, web page, log-in services, sign-up services, payment transaction services, text, web applications, images, archived messages, data, account information, e-services, audio files, video files, etc. In some embodiments, the system 300 may be implemented by the service provider as a server system operating in a client-server environment and managed by the service provider. For example, the server system may include one or more service provider devices 140 having the emulator determination pipeline 155. In an embodiment, the user agent character string may be received from a client device in the client-server environment as part of a client request to access the resource (e.g., an HTTP request).

In some embodiments, the client request may be received by a front tier service as part of a multilayered client-server architecture. For example, the client request may be part of a user log in, user sign up, and/or conducting a transaction (e.g., a payment transaction). The front tier service may pass the client request or relevant information extracted from the client request to a risk data acquisition service (e.g., one or more servers dedicated to risk assessment of incoming network traffic), where the user agent string may be extracted if not already extracted by the front tier service. The user agent string may be provided to the system 300 to determine whether the client device from which the client request originated is using an emulator. For example, the user agent string may be provided to the determination pipeline 155 from the risk data acquisition service to determine whether the client device is using an emulator.

Figure 3:
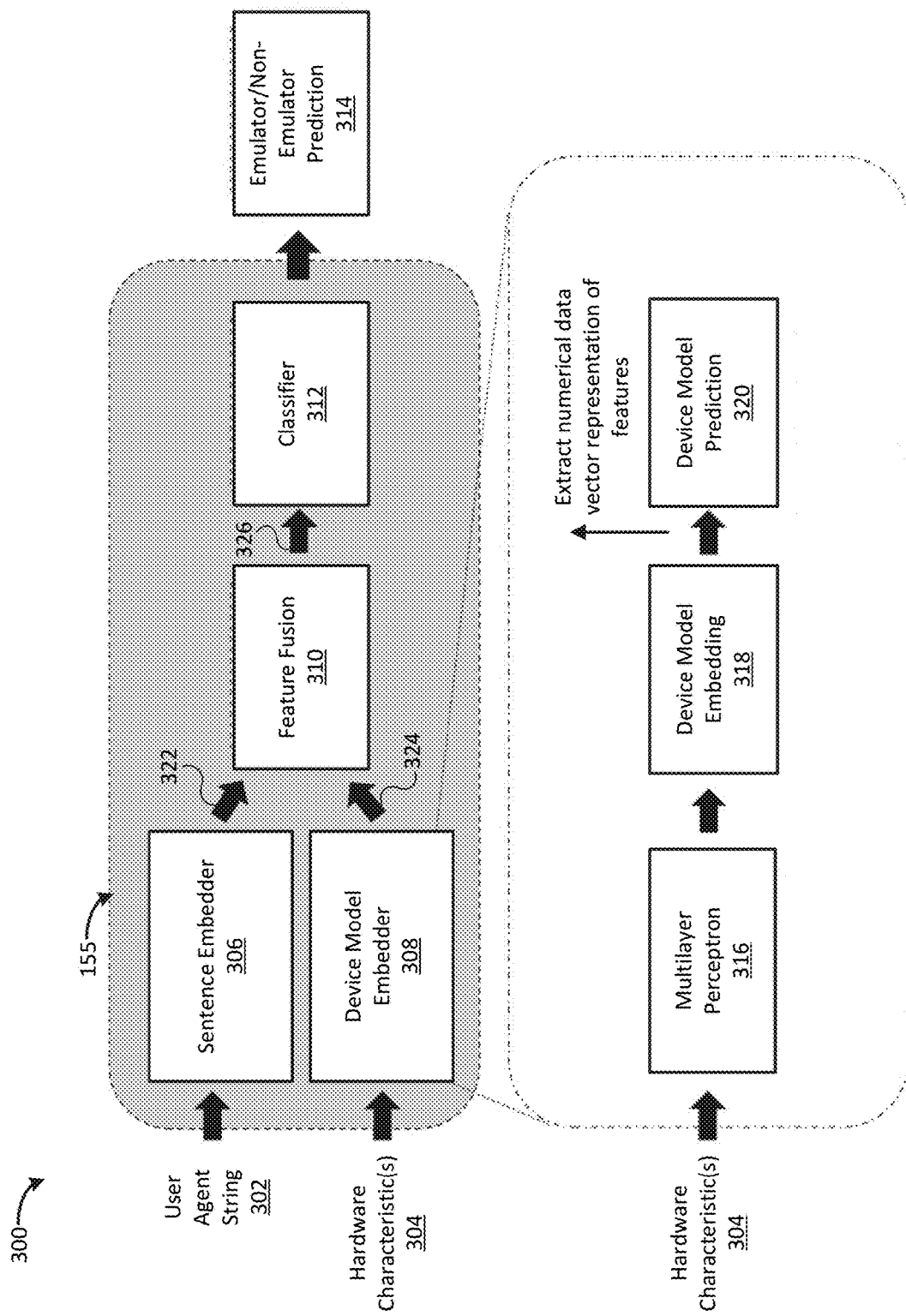
FIG. 3 illustrates an emulator detection pipeline in accordance with one or more embodiments of the present disclosure.
Figure 4:
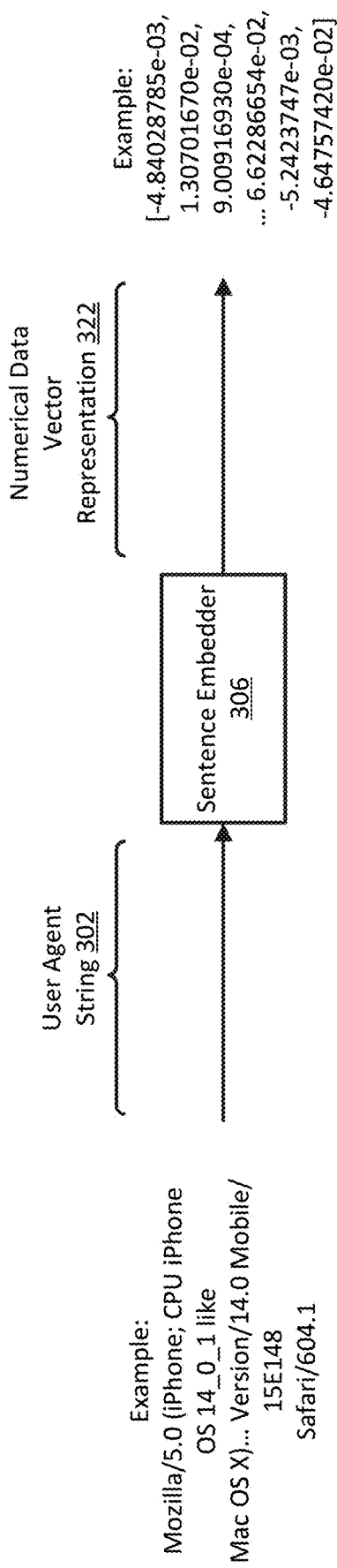
FIG. 4 illustrates user agent sentence embedding in accordance with one or more embodiments of the present disclosure.

At block 204, the pipeline 155 may embed a user agent string 302 into a first numerical data vector representation 322 of the user agent computer application, shown in FIG. 3. For example, as shown in FIG. 4, the user agent string 302 may be inputted into a sentence embedder 306, which may output the first numerical data vector representation 322 of the user agent string. For example, as shown in FIG. 4, a user agent string "Mozilla/5.0 (iPhone; CPU iPhone OS 14_0_1 like Mac OS X) . . . Version/14.0 Mobile/15E148 Safari/604.1" may be inputted to the sentence embedder 306, and a data vector representation [-4.84028785e-03, 1.30701670e-02, 9.00916930e-04, . . . 6.62286654e-02, -5.2423747e-03, -4.64757420e-02] may be outputted as the numerical data vector representation 322.

A sentence embedder 306 may be implemented in the pipeline 155 as shown in FIG. 3. In some embodiments, the sentence embedder 306 may embed the user agent string into the first numerical data vector representation 322 by generating a plurality of character n-grams based on the character string of the user agent string. In some embodiments, n-gram may refer to a contiguous sequence of n items from a given text. As a simple illustration, a list of character 3-grams for an example string "mobile" would be "<mo", "mob", "obi", "bil", "ile", and"le>", wherein "<" and ">" represent the beginning and ending of the string. A list of character 4-grams would be "<mob", "mobi", "obil", "bile", and "ile>". A list of character 5-grams would be "<mobi", "mobil", "obile", and "bile>". As a final example, a list of character 6-grams would be "<mobil", "mobile", and "obile>". The number n in the n-grams may be selected to suit a desired application. It is noted that, in some embodiments, "<" and ">" may not be used to represent the beginning and ending of a string.

The sentence embedder 306 may then hash each of the character n-grams into hash values via a hashing function. Since there may be a large number of unique n-grams that are possible given the large number of user agent strings in existence, applying a hashing function to character n-grams may bound memory requirements to permit scalability in implementing embodiments of the present disclosure. For example, there may be a unique dictionary of 1 to K items given all the user agents in existence, but a hashed dictionary of 1 to B may be used where B is less than K. Although collisions may be possible, the hashing helps to control the vocabulary size. Various hashing functions (e.g., algorithms) may be used to suit a desired application as would be understood by one of skill in the art. As one example, the Fowler/Noll/Vo (FNV) hashing function may be used.

The sentence embedder 306 may embed the hashed character n-grams into the first numerical data vector representation 322 of the user agent. For example, the hashed character n-grams each may be a hash value corresponding to a dimension of a vector. In some embodiments, block 204 may be implemented using a sentence embedding algorithm. For example, the FastText algorithm may be used to receive as input the raw user agent character string 302 and transform the user agent character string 302 into the data vector representation 322 output (e.g., an n-dimension vector). FastText allows for unsupervised training for representations of words or sentences and transforming words or sentences into its vector representations based on sentence semantics. Since FastText can distinguish n-grams of words (subwords), it can be generalized to unseen words/sentences. Oftentimes, user agents appear as a first impression as they can take different forms and have evolved over time along with technology. Thus, the FastText algorithm may provide for scalability as user agent expressions change in the future, since it can be generalized to unseen words/sentences found in previously unseen user agent strings. Other sentence embedding algorithms such as the Sentence-BERT algorithm may be implemented according to other embodiments.

It will be appreciated that sentence embedding algorithms are different than rule-based tokenizers (token-based algorithms, keyword-based algorithms) used to extract value information such as browser type, browser version, device specifications, etc. from user agent strings. Building such rule-based tokenizers requires great manual effort and tokenizers are not able to generalize to previously unseen user agents.

Referring back to FIG. 2, at block 206, the system 300 may obtain hardware characteristic(s) of the client device. For example, in one embodiment, the system 300 may request, from the client device, information about the hardware on the client device. In response to the request for hardware information, the client device may send a response to the system 300 that includes the hardware characteristics of the client device. In some cases, the hardware characteristics may be received from the client device as parameters in an API request made by the client device to the system 300. In some cases, the hardware characteristics may be included in an API response sent from the client device responsive to a request from the system 300.

Hardware characteristics may include battery characteristics in some embodiments. For example, battery characteristics may include a voltage and/or current of a battery, a current operating temperature of the battery, a type of battery (e.g., Li-Ion, LiPo, etc.), a battery capacity (e.g., mAh), a charging rate of the battery, a state of charge, a state of power, a number of charge cycles, etc.

The hardware characteristics may include central processing unit (CPU) characteristics in some embodiments. For example, the CPU characteristics may include a core count, a clock speed, a max turbo frequency, thread counts, L cache sizes, memory speed, etc.

The hardware characteristics may include memory characteristics in some embodiments. For example, the memory characteristics may include a type of memory (e.g., dynamic random access memory (DRAM) or static random access memory (SRAM)), a memory size, a double data rate (DDR) classification, a frequency (e.g., clock speed), a column address strobe (CAS) latency value, a memory bandwidth, a memory channel count, error correction code (ECC) memory or non-ECC memory, etc.

The hardware characteristics may include display (e.g., screen) characteristics in some embodiments. For example, the display characteristics may include a type of display, a size of the display, a resolution of the display, a brightness of the display, etc.

The hardware characteristics may include storage device characteristics in some embodiments. For example, the storage device characteristics may include a type of storage device (e.g., hard disk drive, solid state drive or flash memory), storage capacity, access speed (e.g., read/write speeds), form factor, and connection type (e.g., SATA, SAS, SCSI, PATA, etc.).

The hardware characteristics may include sensor characteristics in some embodiments. For example, sensor characteristics may include information about a camera (e.g., resolution, number of cameras on the client device, pixel size, sensor size), gyroscope, accelerometer, magnetometer, proximity sensor, ambient light sensor, microphone, fingerprint sensor, pedometer, barometer, heart rate sensor, thermometer, air humidity sensor, etc. of the client device.

At block 208, the system 300 may predict a device model of the client device based on hardware characteristics 304. For example, the system 300 may provide the hardware characteristics 304 to the device model embedder 308 of the pipeline 155. In various embodiments, the hardware characteristics may be provided as a numerical value representative of the characteristic measurement and/or a Boolean value indicating whether the hardware feature is present on the client device. For example, for a battery characteristic, a value representing a charge of the battery may be provided and/or a Boolean indication as to whether the battery is present may be provided. The hardware characteristics 304 may be provided as a plurality of numerical inputs.

At block 210, the system 300 may embed the device model prediction into a second numerical data vector representation 324. For example, when the plurality of numerical inputs representing the hardware characteristics 304 are provided to a device model embedder 308, the device model embedder 308 may output the second numerical data vector representation 324.

In one embodiment, the device model embedder 308 may be implemented as an artificial neural network (e.g., a multilayer perception 316) to encode the hardware characteristics 304 by predicting the corresponding device model. The numerical data vector representation 324 of the hardware features immediately before the activation function of the artificial neural network at an output layer (or a hidden layer according to some embodiments) may be used as the second numerical data vector representation 324 of the hardware characteristics 304. Thus, the numerical data vector representation 324 may be extracted before a device model prediction 320 provided by the artificial neural network.

The device model embedder 308 may be trained according to various techniques. For example, in an embodiment, training the device model embedder 308 may be split into two steps. At step one, hardware data and corresponding device models may be prepared as training data sets. For example, hardware data for a device may be collected from known non-emulator payloads and the hardware data may be annotated/labeled by extracting device model information from a corresponding user agent string for the device. For example, a payload for a client device may be associated with a user agent string: "Mozilla/5.0 (iPhone; CPU iPhone OS 14_0_1 like Mac OS X) . . . Version/14.0 Mobile/15E148 Safari/604.1." The system 300 may parse the user agent string and automatically extract the device model "iPhone" to be used as a label for the corresponding hardware features of the payload.

At step two, the neural network is trained with a sufficient volume of training data (e.g., iteratively determined biases and weights that satisfy an accuracy measurement on test data), such that the neural network may be used for device model prediction. For example, hardware characteristics from a live payload (e.g., unseen, new data) may be inputted to the neural network, and the neural network may classify the hardware characters as a device model (e.g., multi-class classification). The data vector representation of the hardware characteristics that are correlated to a predicted device model may be extracted from the neural network classification process after device model embedding 318 to be used as the second data vector representation 324. In other words, the numerical data vector representation input immediately before the activation function of the neural network for the device model prediction 320 (e.g., before the activation function of nodes at an output layer of the neural network) may be extracted and used as the second numerical data vector representation 324 of the hardware characteristics.

At block 212, the system 300 may determine whether the client device is using an emulator based on the first numerical data vector representation 322 and the second numerical data vector representation 324. For example, after transforming both the user agent string 302 and hardware characteristics 304 into vector representations, the system 300 may perform a feature fusion 310 to combine the vector representations 322 and 324. In an embodiment, the feature fusion 310 may combine the vector representations 322 and 324 by concatenating the first numerical data vector representation 322 to the second numerical data vector representation 324, or vice versa. The first numerical data vector representation 322 and the second numerical data vector representation 324 may be combined to form a third numerical data vector representation 326 that the system 300 may input to a downstream emulator classifier 312 of the pipeline 155 to detect whether the client device is using an emulator.

In various embodiments, the classifier 312 may be implemented using machine learning algorithms. For example, training data that includes combinations of user agent string and hardware characteristic vector representations may be assembled and inputted to a machine learning training model, which learn from the training data to create the trained classifier 312 (which can be used to make determinations for unknown client devices as to whether the unknown client device is using an emulator). Training data used for the learning process may be labeled prior to being fed into the machine learning training model. For example, combined user agent string and hardware characteristics vector representations may be labeled as known to be using an emulator or known to not be using an emulator.

In some embodiments, the machine learning model used to create the classifier 312 may be an implementation of the extreme gradient boosting algorithm (XGBoost) according to some embodiments. XGBoost may provide a high-performance implementation of gradient boosted decision trees. During a training process, the machine learning model implemented using XGBoost may train lower-level machine learning models in succession, with each new model being trained to predict the errors made by previous models. The training may proceed iteratively where new models that predict the errors of prior models are sequentially added and then combined with the prior models until no further improvements can be made. The result is a trained classifier 312 that can be used on unknown data to provide a binary prediction 314 that classifies the client device as using an emulator or not using an emulator. It is noted that XGBoost is an example implementation and various other machine learning algorithms are contemplated, such as other decision-tree based ensemble machine learning algorithms that may use a gradient boosting framework.

At block 214, the system may perform remedial action(s) based on whether the client device is predicted to be using an emulator. The prediction 314 outputted by classifier 312 may be stored in a database (e.g., database 145). In some cases, the prediction 314 may allow for further investigation of the client device to further confirm whether the client device is using an emulator or not. In some cases, the prediction 314 can be associated with the client device or an account for the client device and the client device/account can be placed on a whitelist or blacklist for further investigation and/or blocking the client so that the client device is prevented from accessing any resources to which it has requested access. In some embodiments, the system 300 may perform IP address blocking, user agent activity monitoring and data collection for a client device that has been determined to be using an emulator.

Various test result measurements may be used to determine the suitability of the classifier 312, such as accuracy, precision, recall, and F-score. In some embodiments, the AUC of ROC (Area Under the Curve of Receiver Characteristic Operator) curve may be used to inform how well the classifier 312 is performing. The ROC curve is an evaluation metric for binary classification problems. The ROC curve is a probability curve that plots the true positive rate against false positive rates at various threshold values. The AUC does not rely on a decision prediction threshold. The AUC is the measure of the ability of a classifier to distinguish between classes and is generally used as a summary of the ROC curve. Generally, the higher the AUC (e.g., from 0 to 1), the better the performance of the classifier 312 at distinguishing between positive and negative classes, or in the context of the present disclosure, between emulators and non-emulator devices. For example, when AUC is 1, the classifier 312 is able to perfectly distinguish between emulator and non-emulator devices. When AUC is 0, the classifier 312 would be predicting all non-emulator devices as emulators, and all emulators as non-emulator devices. When AUC is between 0.5 and 1 (e.g., an AUC of 0.844), there is a high probability that the classifier 312 will be able to distinguish emulators from non-emulator devices.

Figure 5:
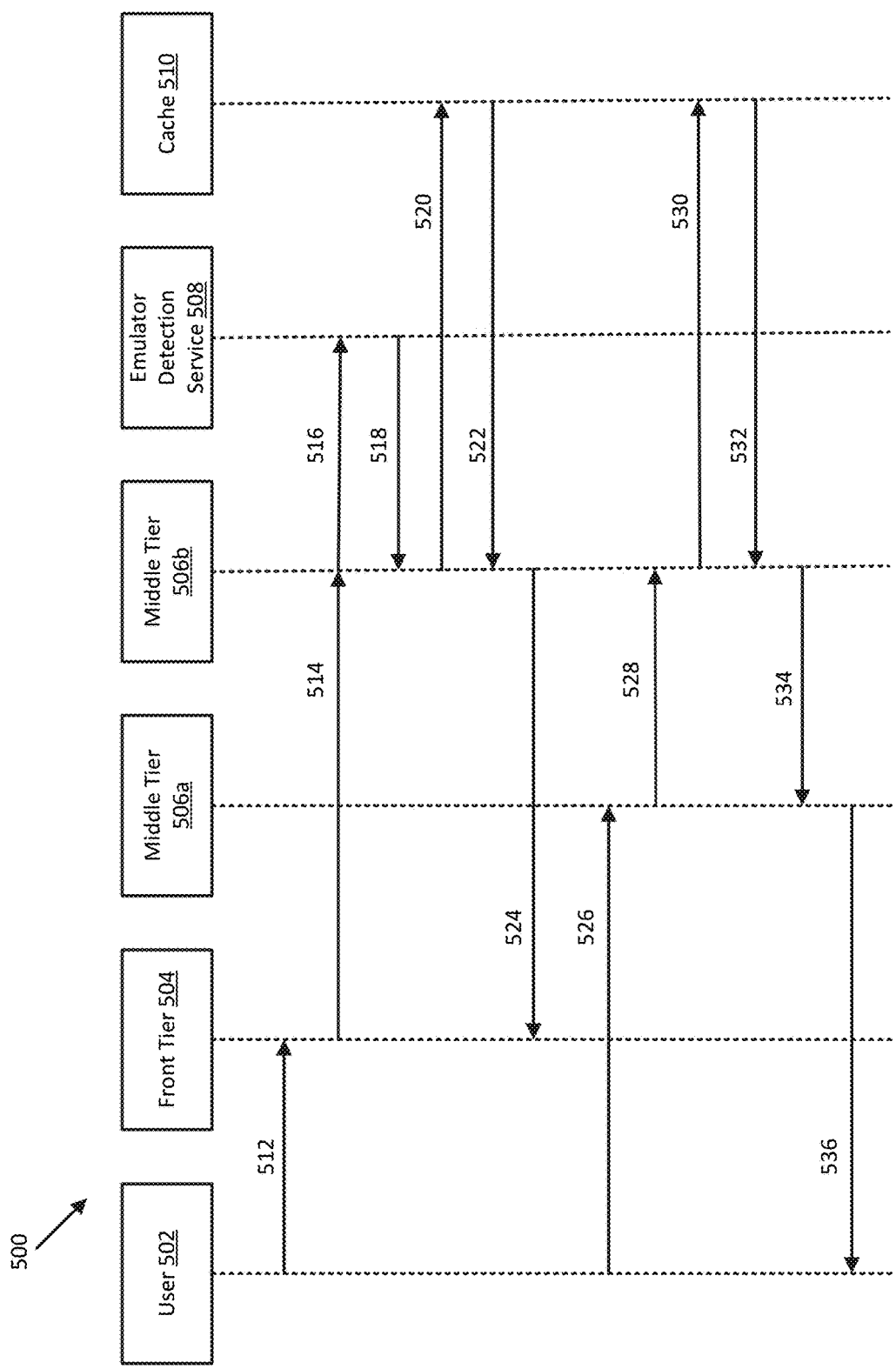
FIG. 5 illustrates a timing sequence for a multilayered client-server architecture used in emulator detection according to one or more embodiments of the present disclosure.

Referring now to FIG. 5, illustrated is a timing sequence 500 for a multilayered client-server architecture according to one or more embodiments of the present disclosure. The multilayered client-server architecture may include a front tier 504, middle tiers 506a and 506b, an emulator detection service 508, and a cache 510. The front tier 504 may be a client-facing tier that manages collecting data from client devices (e.g., a client device of user 502). For example, when there is an event such as a user log in or user sign up, the front tier service 504 may receive the data from the client device associated with the event. The middle tiers 506a and 506b may be tiers in the multilayered client-server architecture which may manage performing services, for example, services related to payment transactions (e.g., payment requests, checkout requests) and fraud-risk analysis and adjudication. For example, middle tiers 506a and 506b may be components of a risk data acquisition tier upon which the front tier 504 relies for determining fraud-risk for incoming requests from user agents. The emulator detection service 508 may provide services to middle tiers 506a and 506b by determining whether a client device is running an emulator, for example, by using the process 200 of FIG. 2. The cache 510 may be used to store the emulator determinations by the emulator detection service 508, so that, in the future, detecting whether a client device has been checked and determined to be an emulator or non-emulator can be quickly performed through query to the cache 510.

At operation 512, front tier 504 may receive a client request from a user agent running on a client device of the user 502. For example, the client request may be part of a user log in, user sign up, payment transaction, resource request, and so forth. At operation 514, data from the client request can be passed to middle tier 506b for determining whether the client device is an emulator or a non-emulator device. At operation 516, the middle tier 506b may provide the data, including a user agent string, to the emulator detection service 508 and make a request to the emulator detection service 508 to provide the middle tier 506b with a classification of the client device as an emulator or non-emulator device. The emulator detection service 508 may perform the process 200 and, at operation 518, provide a response to the middle tier 506b with the classification of the client device as either an emulator or a non-emulator device. At operation 520, the middle tier 506b may store the response from the emulator detection service 508 in the cache 510 for future queries regarding the emulator/non-emulator classification of the client device of the user 502. The cache 510 may store data in various schemas as would be understood by one skilled in the art to allow for quick lookup of client devices that have been analyzed and associated with a classification. For example, client devices may be linked to a client device identifier in the cache 510 so that when a request from a client device, which includes the client device identifier, is received, the client device can be traced back to an emulator/non-emulator classification that is mapped to the client device identifier. Once stored at the cache 510, the response can be passed back through the middle tier 506b to the front tier 504 at operations 522 and 524. The front tier 504 and/or the middle tier 506b may then take an appropriate action including any remedial actions based on whether the client device was classified as an emulator or a non-emulator device.

At operation 526, such as during a future event (e.g., payment transaction checkout or other resource/service request), the middle tier 506a may receive a request, including a client device identifier, from the client device of the user 502 and may pass the payload data associated with the request to the middle tier 506b at operation 528 to determine whether the client device is a fraud risk (e.g., using an emulator). The middle tier 506b may query the cache 510 at operation 530 using the client identifier. The cache 510 may provide a response to the middle tier 506b at operation 532 indicating the classification associated with the client device identifier (e.g., emulator or non-emulator device). At operation 534, the response may be passed to the middle tier 506a and, based on the response, the middle tier 506a may respond to the client request from the user 502 at operation 536. For example, the middle tier 506a may grant the client request and respond with the requested resources and services or facilitate delivery of the same. Where the client device is classified as an emulator, the middle tier 506a may deny the request received from the client device, and further, in some embodiments may prevent the client device from submitting additional requests or may take another remedial action as discussed herein.

Figure 6:
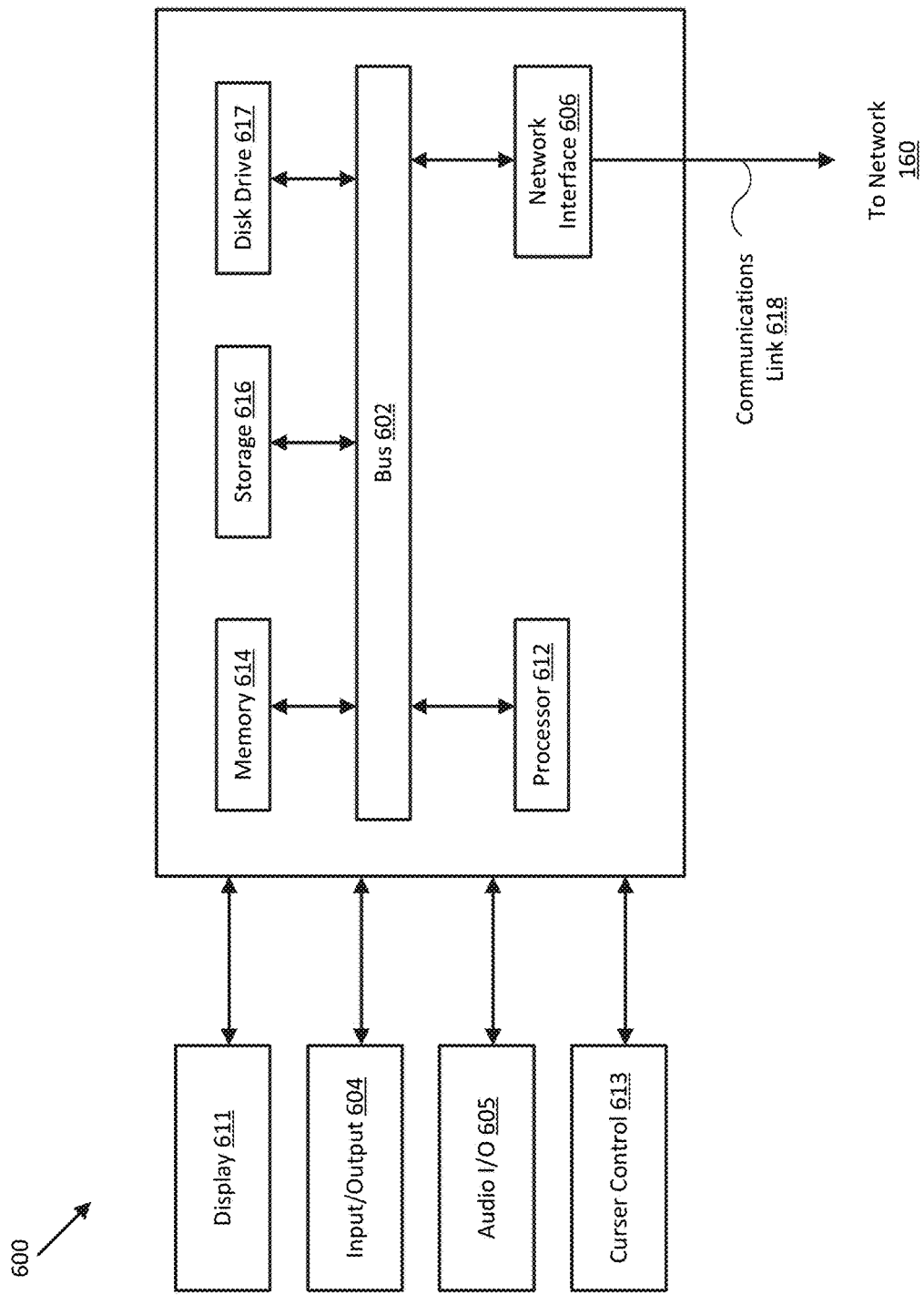
FIG. 6 illustrates a block diagram of a computer system in accordance with one or more embodiments of the present disclosure.

FIG. 6 illustrates a block diagram of a computer system 600 suitable for implementing one or more embodiments of the present disclosure. In various implementations, the computer system 600 may comprise a personal computing device (e.g., a personal computer, laptop, smart phone, PDA, Bluetooth device, wearable device such as a smart watch, smart TV, etc.) and/or a server computing device. It should be appreciated that each of the devices utilized by users and service providers discussed herein may be implemented as the computer system 600 in a manner as follows.

Computer system 600 includes a bus 602 or other communication mechanism for communicating information data, signals, and information between various components of computer system 600. Components include an input/output (I/O) component 604 that processes a user action, such as selecting keys from a keypad/keyboard, selecting one or more buttons or links, etc., and sends a corresponding signal to bus 602. I/O component 604 may also include an output component, such as a display 611 and a cursor control 613 (such as a keyboard, keypad, mouse, etc.). I/O component 604 may further include NFC communication capabilities. An optional audio I/O component 605 may also be included to allow a user to use voice for inputting information by converting audio signals. Audio I/O component 605 may allow the user to hear audio such as audible descriptions provided by a screen reader application. A transceiver or network interface 606 transmits and receives signals between computer system 600 and other devices, such as another user device, an entity server, and/or a provider server via network 160. In one embodiment, the transmission is wireless, although other transmission mediums and methods may also be suitable. Processor 612, which may be one or more hardware processors, can be a micro-controller, digital signal processor (DSP), or other processing component, processes these various signals, such as for display on computer system 600 or transmission to other devices via a communication link 618. Processor 612 may also control transmission of information, such as cookies or IP addresses, to other devices.

Components of computer system 600 also include a system memory component 614 (e.g., RAM), a static storage component 616 (e.g., ROM), and/or a disk drive 617. Computer system 600 performs specific operations by processor 612 and other components by executing one or more sequences of instructions contained in system memory component 614. Logic may be encoded in a computer-readable medium, which may refer to any medium that participates in providing instructions to processor 612 for execution. Such a medium may take many forms, including but not limited to, non-volatile media, volatile media, and transmission media. In various implementations, non-volatile media includes optical or magnetic disks, volatile media includes dynamic memory, such as system memory component 614, and transmission media includes coaxial cables, copper wire, and fiber optics, including wires that comprise bus 602. In one embodiment, the logic is encoded in non-transitory computer readable medium. In one example, transmission media may take the form of acoustic or light waves, such as those generated during radio wave, optical, and infrared data communications.

Some common forms of computer readable media include, for example, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 600. In various other embodiments of the present disclosure, a plurality of computer systems 600 coupled by communication link 618 to the network 160 (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. Having thus described embodiments of the present disclosure, persons of ordinary skill in the art will recognize that changes may be made in form and detail without departing from the scope of the present disclosure.

What is claimed is:

1. A computer system comprising:
    a non-transitory memory storing instructions; and
    one or more hardware processors configured to read the instructions and cause the computer system to perform operations comprising:
        receiving, from a client device, a user agent string corresponding to a user agent computer application that has requested access to a resource associated with the computer system;
        embedding the user agent string into a first numerical data vector representation of the user agent computer application;
        obtaining, from the client device, one or more hardware characteristics of the client device;
        predicting a device model for the client device based on the one or more hardware characteristics;
        embedding device model features extracted from the device model prediction into a second numerical data vector representation; and
        determining whether the client device is using an emulator based on the first numerical data vector representation and the second numerical data vector representation.

2. The computer system of claim 1, wherein the operations further comprise:
    combining the first numerical data vector representation and the second numerical data vector representation into a third numerical data vector representation; and
    providing the third numerical data vector representation to a classifier trained to predict whether a client device is using an emulator.

3. The computer system of claim 2, wherein the first numerical data vector representation and the second numerical data vector representation are combined using concatenation.

4. The computer system of claim 2, wherein the predicting the device model and the embedding the device model prediction into the second numerical data vector representation are performed by an artificial neural network prior to an activation function of the artificial neural network.

5. The computer system of claim 1, wherein the one or more hardware characteristics comprises at least one of battery characteristics, central processing unit (CPU) characteristics, memory characteristics, screen characteristics, disk characteristics, or sensor characteristics.

6. The computer system of claim 1, wherein the operations further comprise training a device model embedder by:
   extracting hardware data from non-emulator payloads;
   extracting device model data by parsing user agent strings of the non-emulator payloads;
   labeling the extracted hardware data with the corresponding extracted device model data to generate training data; and
   providing the training data to a machine learning model that teaches the machine learning model how to predict the device model for the client device based on the one or more hardware characteristics.

7. The computer system of claim 1, wherein the embedding the user agent string into a first numerical data vector representation of the user agent computer application is performed using a sentence embedding algorithm.

8. A method comprising
   receiving, by a computer system from a client device, a user agent string corresponding to a user agent computer application that has requested access to a resource associated with the computer system;
   embedding, by the computer system, the user agent string into a first numerical data vector representation of the user agent computer application;
   obtaining, from the client device, one or more hardware characteristics of the client device;
   providing the one or more hardware characteristics to a prediction model;
   extracting a second numerical data vector representation output from the prediction model corresponding to features of a predicted device model for the client device; and
   determining whether the client device is using an emulator based on the first numerical data vector representation and the second numerical data vector representation.

9. The method of claim 8, further comprising extracting, by the computer system, the user agent string from a Hypertext Transfer Protocol (HTTP) request.

10. The method of claim 8, further comprising preventing the client device from accessing the resource in response to determining that the client device is using an emulator.

11. The method of claim 8, wherein the embedding the user agent string into the first numerical data vector representation comprises:
    generating a plurality of character n-grams based on the user agent string;
    hashing, via a hashing function, each of the plurality of character n-grams; and
    embedding the hashed character n-grams into the first numerical data vector representation of the user agent computer application.

12. The method of claim 8, wherein the embedding the user agent string into the first numerical data vector representation is performed using a FastText sentence embedding algorithm.

13. The method of claim 8, wherein the determining whether the client device is using an emulator comprises:
    concatenating the second numerical data vector representation to the first numerical data vector representation to form a third numerical data vector representation; and
    providing the third numerical data vector representation to a classifier trained to predict whether a client device is using an emulator.

14. The method of claim 13, further comprising:
    extracting hardware data from non-emulator payloads;
    extracting device model data by parsing user agent strings from the non-emulator payloads;
    labeling the extracted hardware data with the corresponding extracted device model data to generate training data; and
    training the classifier, using the generated training data, to predict the device model for the client device.

15. The method of claim 8, further comprising blocking an IP address associated with the user agent in response to determining that the client device is using an emulator.

16. A non-transitory machine-readable medium having instructions stored thereon, wherein the instructions are executable to cause a machine of a system to perform operations comprising:
    receiving, from a client device, a user agent string corresponding to a user agent computer application that has requested access to a resource of the system;
    embedding the user agent string into a first numerical data vector representation of the user agent computer application;
    obtaining, from the client device, one or more hardware characteristics of the client device;
    predicting a device model for the client device based on the one or more hardware characteristics;
    embedding device model features extracted from the device model prediction into a second numerical data vector representation; and
    determining whether the client device is using an emulator based on the first numerical data vector representation and the second numerical data vector representation.

17. The non-transitory machine-readable medium of claim 16, wherein the operations further comprise:
    combining the first numerical data vector representation and the second numerical data vector representation to generate a third numerical data vector representation; and
    providing the third numerical data vector representation to a classifier trained to predict whether a client device is using an emulator.

18. The non-transitory machine-readable medium of claim 16, wherein the one or more hardware characteristics comprises at least one of:
    battery characteristics comprising a battery voltage, a battery temperature, a battery capacity, and a battery state;
    central processing unit (CPU) characteristics comprising a number of CPU cores;
    memory characteristics comprising a memory size;
    screen characteristics comprising a screen width, a screen height, and a screen brightness;
    disk characteristics comprising a type of disk drive; or
    sensor characteristics comprising a presence of an accelerometer or a presence of a gyroscope.

19. The non-transitory machine-readable medium of claim 16, wherein the embedding the device model prediction into the second numerical data vector representation comprises extracting the second numerical data vector representation from an artificial neural network prior to an activation function of the neural network as the artificial neural network performs the predicting the device model.

20. The non-transitory machine-readable medium of claim 16, wherein the user agent string is received from another machine of the system, the other machine configured to prevent the user agent computer application from accessing the resource of a service provider in response to receiving a message from the machine indicating that the client device is using the emulator.

* * * * *